(12) United States Patent
Cudak et al.

(10) Patent No.: US 10,449,449 B2
(45) Date of Patent: Oct. 22, 2019

(54) REDUCING THE BANDWIDTH REQUIREMENTS OF MULTIPLAYER GAMING SESSIONS

(71) Applicant: LENOVO ENTERPRISE SOLUTIONS (SINGAPORE) PTE. LTD., Singapore (SG)

(72) Inventors: Gary D. Cudak, Creedmoor, NC (US); Christopher J. Hardee, Raleigh, NC (US); Randall C. Humes, Raleigh, NC (US); Adam Roberts, Moncure, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 179 days.

(21) Appl. No.: 13/920,106

(22) Filed: Jun. 18, 2013

(65) Prior Publication Data
US 2014/0370981 A1 Dec. 18, 2014

(51) Int. Cl.
*A63F 13/358* (2014.01)
*A63F 13/58* (2014.01)

(52) U.S. Cl.
CPC ............ *A63F 13/358* (2014.09); *A63F 13/58* (2014.09)

(58) Field of Classification Search
CPC ......... A63F 13/12; A63F 13/358; A63F 13/58
See application file for complete search history.

(56) References Cited

U.S. PATENT DOCUMENTS

| | | | |
|---|---|---|---|
| 5,987,376 A | 11/1999 | Olson et al. | |
| 6,346,048 B1 | 2/2002 | Ogawa et al. | |
| 6,701,344 B1 | 3/2004 | Holt et al. | |
| 7,711,847 B2 | 5/2010 | Dhupelia et al. | |
| 7,761,548 B2 | 7/2010 | Snyder et al. | |
| 7,883,418 B2* | 2/2011 | Hiroyama et al. ............... | 463/42 |
| 8,052,531 B2 | 11/2011 | Onuki et al. | |
| 2001/0042110 A1* | 11/2001 | Furusawa ............. | H04L 67/101 709/219 |
| 2002/0141343 A1* | 10/2002 | Bays ................... | H04L 41/0893 370/235 |
| 2004/0116186 A1 | 6/2004 | Shim et al. | |
| 2006/0247011 A1 | 11/2006 | Gagner | |
| 2006/0287097 A1 | 12/2006 | Moshal | |
| 2010/0009758 A1* | 1/2010 | Twitchell, Jr. ........ | H04L 45/586 463/42 |

OTHER PUBLICATIONS

Riera et al., "A Zone-based Gaming Architecture for Ad-Hoc Networks", Institue of Operating Systems and Computer Networks, Technical University of Braunschweig, NetGames 2003 May 22-23, 2003, Redwood City, CA, USA, Copyright 2003 ACM 1-58113-734-6/03/0005, pp. 72-76.

* cited by examiner

*Primary Examiner* — Robert T Clarke, Jr.
*Assistant Examiner* — Thomas H Henry

(57) ABSTRACT

A computer identifies a group of players that are participating in a gaming session that is hosted by the computer. The computer identifies the location of an avatar of a first player included in the group of players. The computer identifies the location of a second avatar of a second player included in the group of players and determining the proximity between the first avatar and the second avatar. The computer determines if the proximity exceeds a threshold. Responsive to the determination that the proximity does not exceed the threshold, the computer sends data for the gaming session to the first player and the first player passes that data to the second player.

17 Claims, 4 Drawing Sheets

REDUCING THE BANDWIDTH REQUIREMENTS OF MULTIPLAYER GAMING SESSIONS

FIELD OF THE INVENTION

The present invention relates generally to the field of network management, and more particularly to reducing the amount of network resources that are required to support multiplayer gaming sessions.

BACKGROUND OF THE INVENTION

A multiplayer online game is a multiplayer video game which can be played via a game server over the internet, with other players around the world. A massively multiplayer online game (also called MMO and MMOG) is a multiplayer video game which is capable of supporting large numbers of players simultaneously. By necessity, they are played on the Internet. Many games have at least one persistent world; however others just have large numbers of players competing at once in one form or another without any lasting effect to the world at all. Multiplayer online game games differ from MMOGs in that they do not create a persistent world, but create a playing arena for the purpose of a single game or round. In other words, they rely on a game listen server used only for that round, and there can be numerous servers all around the world. MMOGs on the other hand, rely on dedicated servers, as these games must be running continuously.

Games that support and promote cooperative play are rapidly increasing in popularity. The load on bandwidth, on the server side, to support so many players can be significant. This load is increasing due to the rise in popularity of multiplayer online games and MMOGs.

SUMMARY

Embodiments of the present invention provide a system, method, and program product for distributing data during a gaming session. A computer identifies a group of players that are participating in a gaming session, wherein the gaming session is hosted by the computer. The computer identifies, in the gaming session, the location of a first avatar of a first player included in the group of players. The computer identifies, in the gaming session, the location of a second avatar of a second player included in the group of players. The computer determines a proximity between the first avatar and the second avatar. The computer determines if the proximity exceeds a threshold. Responsive to the determination that the proximity does not exceed the threshold, the computer sends data for the gaming session to the first player, wherein the first player passes the data to the second player.

DETAILED DESCRIPTION

Figure 1:
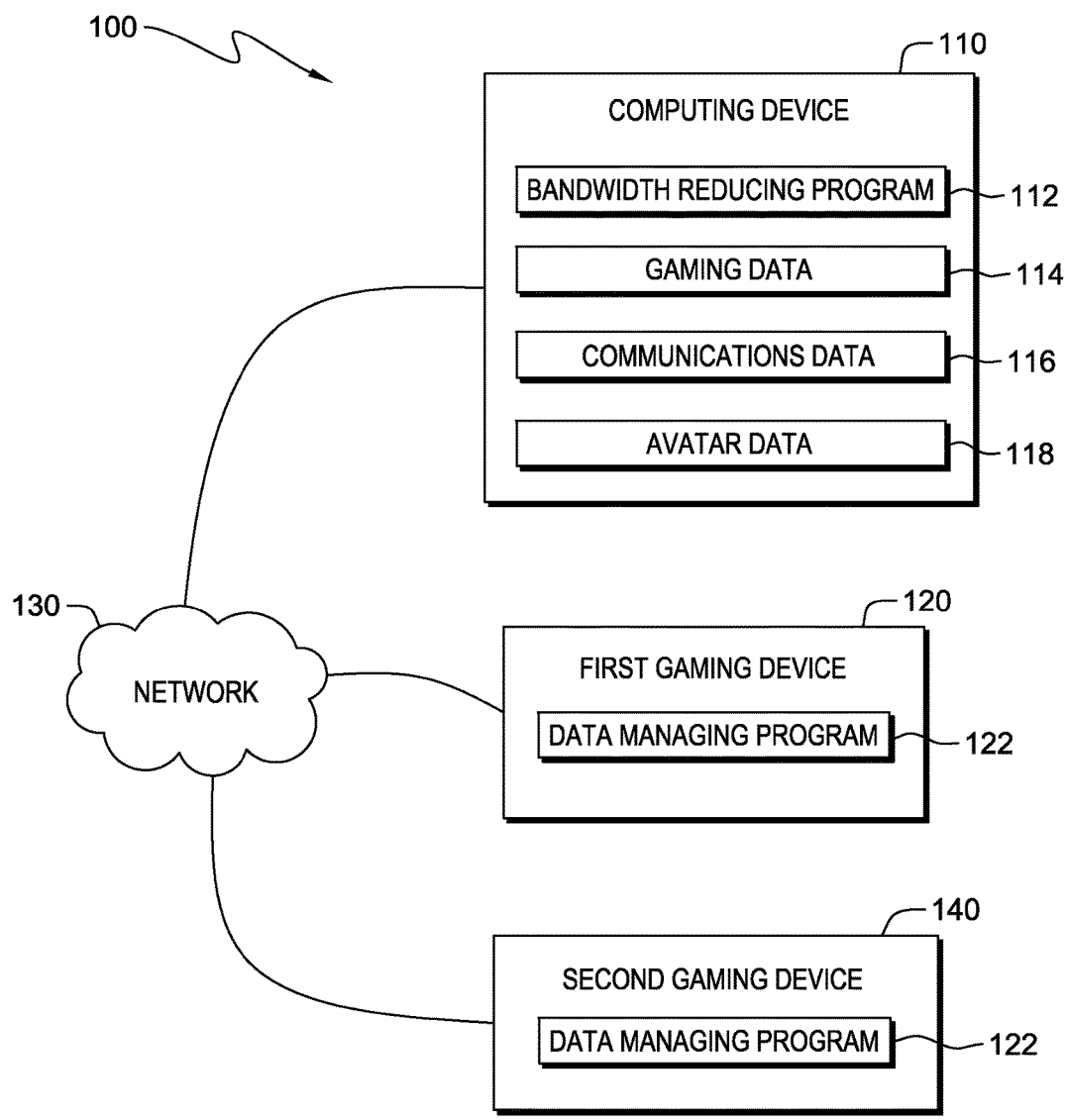
FIG. 1 is a functional block diagram illustrating a gaming network environment, in accordance with an exemplary embodiment of the present invention.

In known solutions, game servers manage game data by sending all data of the data that each client needs to each client. Grouped players receive different information than players that are not grouped. For example, grouped players may receive a variety of information regarding the status of the other players in their group as well as a variety of information regarding their own status. In addition, grouped players are often supplied a group-specific chat. Conversely, non-grouped players only receive a variety of information regarding their own status.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a gaming network environment, generally designated 100, in accordance with one embodiment of the present invention.

Gaming network environment 100 includes computing device 110, first gaming device 120, and second gaming device 140 that are connected via network 130. Computing device 110 includes bandwidth reducing program 112, gaming data 114, communications data 116, and avatar data 118. First gaming device 120 and second gaming device 140 respectively include data managing program 122.

In various embodiments of the present invention, computing device 110 is computing device that can be a stand-alone device, a video game console, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to bandwidth reducing program 112, gaming data 114, communications data 116, and avatar data 118 and is capable of executing bandwidth reducing program 112. Computing device 110 may include internal and external hardware components, as depicted and described in further detail with respect to FIG. 4.

In various embodiments of the present invention, first gaming device 120 and second gaming device 140 are computing devices that can be a standalone devices, video game consoles, servers, laptop computers, tablet computers, netbook computers, personal computers (PCs), or desktop computers. In another embodiment, first gaming device 120 and second gaming device 140 represent computing systems utilizing clustered computers and components to act as a single pool of seamless resources. In general, first gaming device 120 and second gaming device 140 can be any computing device or a combination of devices with access to and are capable of executing data managing program 122. First gaming device 120 and second gaming device 140 may include internal and external hardware components, as depicted and described in further detail with respect to FIG. 4.

In this exemplary embodiment, bandwidth reducing program 112, gaming data 114, communications data 116, and avatar data 118 are stored on computing device 110, while data managing program 122 is respectively stored on first gaming device 120 and second gaming device 140. However, in other embodiments, bandwidth reducing program 112, gaming data 114, communications data 116, avatar data 118, and data managing program 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, first gaming device 120, second gaming device 140, bandwidth reducing program 112, gaming data 114, communications data 116, avatar data 118, and data managing program 122 in accordance with a desired embodiment of the present invention.

In exemplary embodiments, computing device 110 acts as a host server for gaming sessions. Gaming devices 120 and 140 receive massively multiplayer online game (also called MMO and MMOG) gaming data from computing device 110. Bandwidth reducing program 112, executing on computing device 110, includes a set of rules to identify a player's gaming device that can act as a data distributor. The gaming device of the identified player receives data from computing device 110 and passes it on to the gaming devices of the other players.

In exemplary embodiments, the rules, included in bandwidth reducing program 112, generate a weighted value from a variety of information included in gaming data 114, communications data 116, and avatar data 118. In general, information like the connectivity, i.e., the network quality of service, of a player's gaming device and physical location of a player's avatar in relation to the other player's avatars is weighted more heavily than for example, the level of a player's avatar. In some embodiments, the health status of a player's avatar can also be weighted heavily when selecting a gaming device that can act as a data distributor. For example, if a player's avatar is almost out of health points, then that player's gaming device may not be the best choice as a gaming device that can act as a data distributor since there is an increased chance of the avatar being unable to continue during the gaming session. In general, the player, i.e., the gaming device of the player, with the largest weighted value is determined to be best suited to act as the data distributor.

In an exemplary embodiment, to select the gaming device that is best suited to act as a data distributor, bandwidth reducing program 112 first identifies a group of players participating in a gaming session. Bandwidth reducing program 112 then accesses gaming data 114, communications data 116, and avatar data 118, and applies the rules to determine which participating player in the group, hereafter denoted as the first player, is most suitable to act as a distributor of data to the other players in the group. Bandwidth reducing program 112 then identifies which gaming data is common to all of the players in the group and passes that data to data managing program 122, which is executing on the gaming device of the first player. If bandwidth reducing program 112 determines that another player's gaming device is a better choice to distribute data, i.e., a better choice for first player, then bandwidth reducing program 112 will select that gaming device as the new distributor of data to the other players in the group, i.e., the new first player. For example, the gaming device of the first player looses connection with the host server (computing device 110). In response to the first player no longer being able to distribute the common data, bandwidth reducing program 112 selects a new first player from the group of players.

In an exemplary embodiment, data managing program 122 receives a signal, from bandwidth reducing program 112, indicating whether or not the player using the gaming device is the first player. If the player is identified as the first player, then data managing program 122 receives the common data from computing device 110 and passes the common data to the respective data managing program 122 that are executing on the gaming devices of the other players in their group. If the player is not identified as the first player, then data managing program 122 receives the common data from the data managing program 122 that is executing on the gaming device of the first player. In other words, a first player's data managing program 122 receives the common data from bandwidth reducing program 112. The first player's data managing program 122 then passes the common data to the other data managing program 122 of the group.

In an exemplary embodiment, gaming data 114 includes the gaming data that is sent to the players. This gaming data includes common data, which is sent to only the first player, as well as player specific data that is only sent to a specific player. For example, common data can include information such as the location of the first player's avatar, the status of the various players' avatars in the group, group chat data, a region on a map currently being explored by the group, the current quest being attempted by the group etc. Common data generally includes data that is common to all of the players in the group. Information that is not common to the entire group, herein denoted as non-common data, is also included in gaming data 114. Non-common data is usually specific information that applies to a single player. For example, a private chat between two players in the group or the connectivity of a given players gaming device. In this embodiment, non-common data is sent from bandwidth reducing program 112 to the data management program 122 of the player to which the non-common data pertains. For example, a private chat is initiated between two players in the group. The data included in the private chat would not be sent from bandwidth reducing program 112 to the data management program 122 of the first player. Instead, the private chat data would be only sent to the players involved in the chat, via a standard data distribution utilized by the gaming network. In other embodiments, bandwidth reducing program 112 includes additional programming to sort the gaming data included in gaming data 114 and send the common data to the first player and the non-common data to the player(s) to which the non-common data pertains.

In an exemplary embodiment, communications data 116 includes information that defines the connectivity of the players in the group. Communications data 116 includes information such as the available bandwidth between the gaming devices and computing device 110. Communications data 116 includes information such as the available bandwidth between the respective gaming devices. In some instances, the physical location of the gaming devices and computing device 110 can be included in communications data 116. The connectivity of a given gaming device is used by bandwidth reducing program 112 as a factor when identifying the first player from among the group of players.

In an exemplary embodiment, avatar data 118 includes specific information regarding the avatars of each respective player in the group, e.g., the respective locations and the attributes of the avatars. The specific information regarding the avatars of each respective player can include information such as a status of the avatar e.g., attributes such as an avatar status of being petrified, or the amount of health points remaining etc. Other specific information regarding the avatars can include function related attributes, such as the class of the avatar. For example, the leader of the group or the highest level healer. In some gaming scenarios, having faster access to the health status of group members may mean the difference between success and failure of a gaming goal. Therefore, by selecting a healer to act as the first player, the increased access speed to the status of other players can aid in the overall successfulness of the group.

In other scenarios, depending on the location of a given avatar, the graphics information needed to render a gaming world can vary. In many games the details of a given object in the gaming environment are only rendered when a player's avatar is within a certain proximity to that object, i.e., a proximity threshold. If a player in the group scouts ahead of the other players in the group then the graphics information needed by that player's gaming device will not be the same as that need by the other players' gaming devices. Therefore, the location of a player's avatar in relation to the other players' avatars is a factor that bandwidth reducing program 112 takes into account when identifying the first player from among the group of players. As a result, in some instances, bandwidth reducing program 112 may select two or more first players to distribute common data. For example, the group of players split up into two subgroups in order to flank an opponent. In response, bandwidth reducing program 112 identifies a first player for each subgroup to minimize the bandwidth required by the entire group of players.

Figure 2:
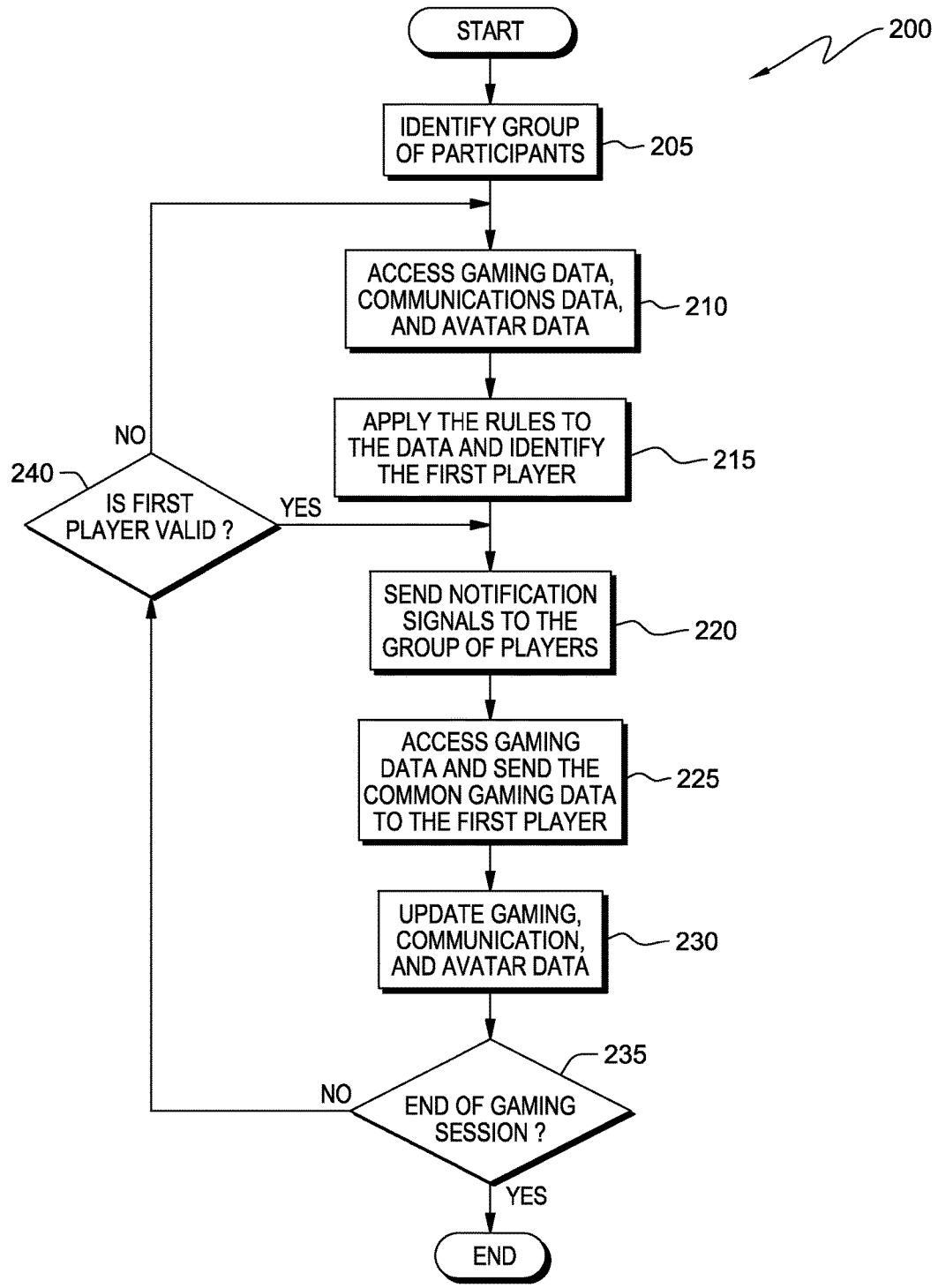
FIG. 2 illustrates operational steps of a bandwidth reducing program, on a computing device within the gaming network environment of FIG. 1, in accordance with an exemplary embodiment of the present invention.

FIG. 2 is a flow chart, 200, illustrating the operational steps of bandwidth reducing program 112 executing on computing device 110, in accordance with an exemplary embodiment.

In step 205, bandwidth reducing program 112 identifies a group of players participating in a gaming session. In step 210, bandwidth reducing program 112 accesses the information included in gaming data 114, communications data 116, and avatar data 118. Then, in step 215, bandwidth reducing program 112 identifies the first player by applying the rules, included in bandwidth reducing program 112, to the information included in gaming data 114, communications data 116, and avatar data 118. For example, a player X's avatar is centrally located among the other players' avatars and player X's gaming device has a level of connectivity that is twice as large as the other players in the group. Bandwidth reducing program 112 generates a weighted value for each of the players and identifies that player X has the largest weighted value. As a result, bandwidth reducing program 112 selects player X to be the first player. In another example, the role an avatar plays in the group is weighed heavily when determining the first player. As a result, bandwidth reducing program 112 generates the highest weighted value for avatar Z whose role in the group is that of a healer. As a result, bandwidth reducing program 112 selects the gaming device corresponding to avatar Z to be the first player.

Bandwidth reducing program 112 then sends notification signals, in step 220, to the group of players participating in the gaming session. Specifically the signals are sent to the respective data managing program 122 executing on each player's respective gaming device, indicating which of the players in the group have been selected as first players. In continuation with the above example, player X's data managing program 122, executing on player X's gaming device, would receive a signal, from bandwidth reducing program 112, indicating that player X's gaming device is to distribute common gaming data to the other players. Conversely, the respective data managing program 122 executing on the gaming devices of players P, D, and Q receive a signal from bandwidth reducing program 112 indicating that player X's gaming device is to distribute common gaming data to them.

In step 225, bandwidth reducing program 112 accesses gaming data 114 and passes the common gaming data to the designated first player. Then, in step 230, bandwidth reducing program 112 updates gaming data 114, communications data 116, and avatar data 118 with new information that was generated after the first common data was sent to the first player. For example, the first player's avatar looses all health points, which is an attribute of the avatar, and is no longer able to continue in the gaming session. Avatar data 118 is updated to reflect the change in the status of the player's avatar.

In decision step 235, bandwidth reducing program 112 determines if the gaming session has ended. If the gaming session has ended (decision step 235, yes branch), then bandwidth reducing program 112 ends execution. If the gaming session has not ended (decision step 235, no branch), then bandwidth reducing program 112 proceed to decision step 240.

In decision step 240, bandwidth reducing program 112 determines if the current first player is still valid. If the first player is valid (decision step 235, yes branch), then bandwidth reducing program 112 proceeds to step 220 and sends out a signal to indicate the first player. For example, bandwidth reducing program 112 applies the rules, included in bandwidth reducing program 112, and determines that the first player is still the best choice for distributing common data to the other players. Therefore, bandwidth reducing program 112 determines that the first player is valid. If the first player is not valid (decision step 235, no branch), then bandwidth reducing program 112 proceeds to step 210 and begins the process of selecting another first player. For example, if the first player's avatar has moved away from the group, then the rules included in bandwidth reducing program 112 would indicate that the player is no longer within the acceptable range required to act a distributor of common information. Therefore, bandwidth reducing program 112 determines that the first player is not valid and proceeds to select another first player.

Figure 3:
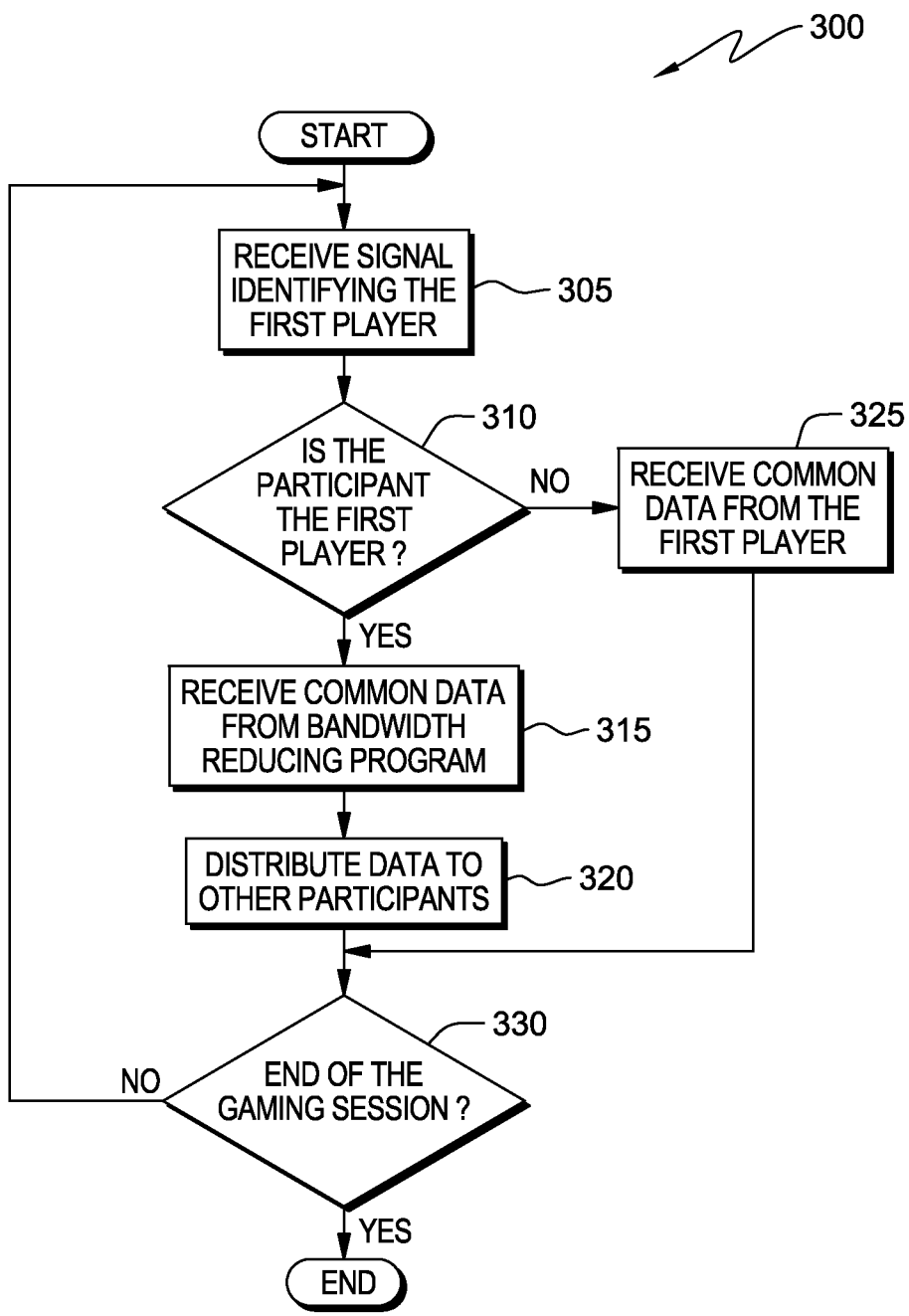
FIG. 3 illustrates operational steps of a data managing program, on first gaming device and second gaming device within the gaming network environment of FIG. 1, in accordance with an exemplary embodiment of the present invention.

FIG. 3 is a flow chart, 300, illustrating the operational steps of data managing program 122 respectively executing on first gaming device 120 and second gaming device 140, in accordance with an exemplary embodiment.

In step 305, data managing program 122 receives a signal from bandwidth reducing program 112 identifying the first player. In decision step 310, data managing program 122 determines if the signal indicates that the participant, the gaming device of that particular player, is the first player, i.e., the participant has been selected as the first player by bandwidth reducing program 112. If the participant is the first player (decision step 310, yes branch), then data managing program 122 proceeds to step 315.

In step 315, data managing program 122 receives the common data from bandwidth reducing program 112. Then, in step 320, data managing program 122 distributes the common data to the other players in the group and proceeds to decision step 330.

If, in decision step 310, data managing program 122 determines that the participant is not the first player (decision step 310, no branch), then data managing program 122 proceeds to step 325. In step 325, data managing program 122 receives the common data from the first player, i.e., from data managing program 122 executing on the gaming device of the first player. Data managing program 122 then proceeds to decision step 330.

In decision step 330, data managing program 122 determines if the gaming session has ended. If the gaming session has ended (decision step 330, yes branch), then data managing program 122 ends execution. If the gaming session has not ended (decision step 330, no branch), then data managing program 122 proceed to decision step 305.

Figure 4:
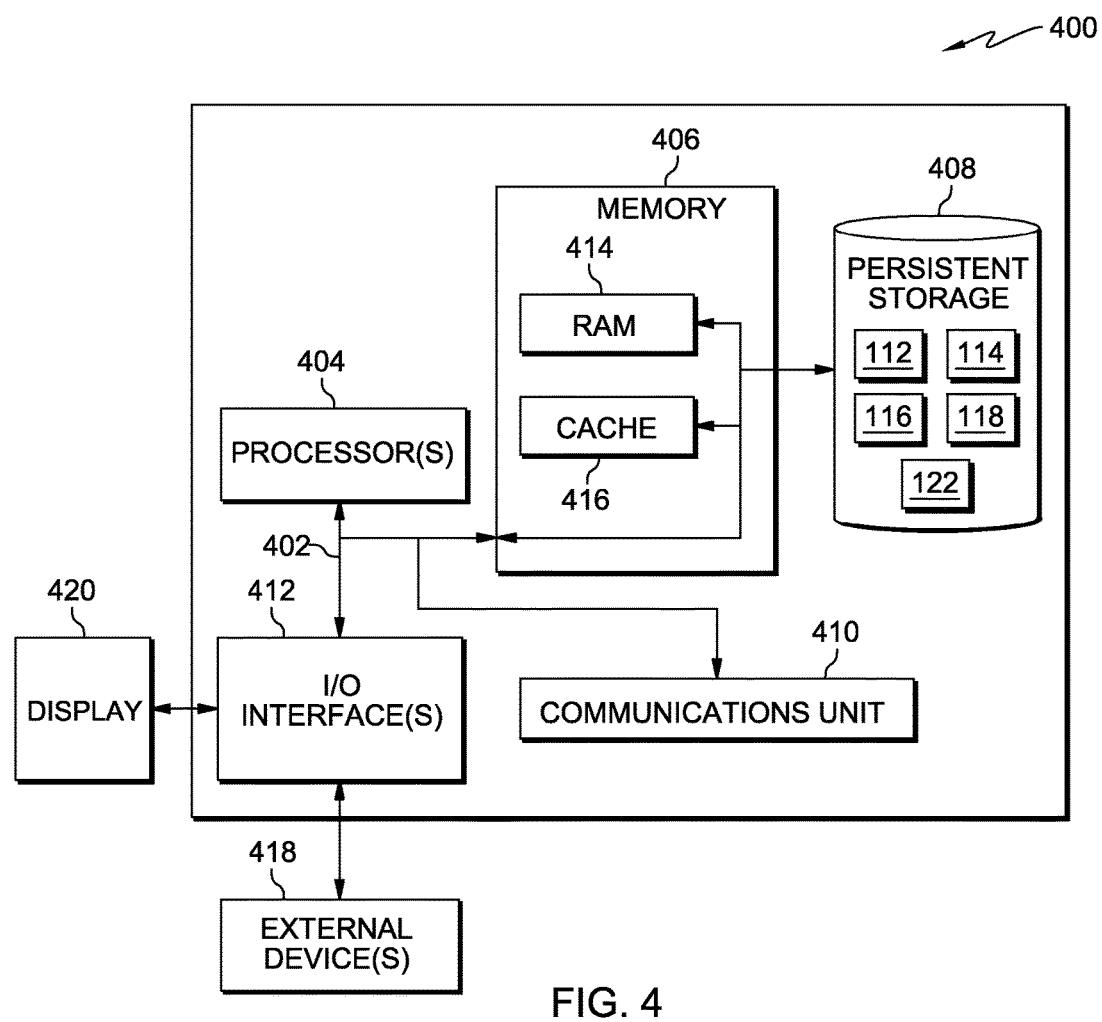
FIG. 4 depicts a block diagram of components of the computing device executing the bandwidth reducing program, and the components of the computing device executing the data managing program, in accordance with an exemplary embodiment of the present invention.

FIG. 4 depicts a block diagram of components of computing device 110, first gaming device 120, and second gaming device 140 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110, first gaming device 120, and second gaming device 140 include respective communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Bandwidth reducing program 112, gaming data 114, communications data 116, avatar data 118, and data managing program 122 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of computing device 110, first gaming device 120, second gaming device 140, and network 130. In these examples, communications unit 410 includes one or more network interface cards. Communications unit 410 may provide communications through the use of either or both physical and wireless communications links. Bandwidth reducing program 112, gaming data 114, communications data 116, avatar data 118, and data managing program 122 may be downloaded to persistent storage 408 through communications unit 410.

I/O interface(s) 412 allows for input and output of data with other devices that may be connected to computing device 110, first gaming device 120, and second gaming device 140. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., bandwidth reducing program 112, gaming data 114, communications data 116, avatar data 118, and data managing program 122, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
a computer identifying a group of players that are participating in a gaming session hosted by the computer, the gaming session including a gaming environment, each player of the group of players represented in the gaming environment by a respective avatar, the computer comprising a bandwidth reducing program;
the computer determining, by the bandwidth reducing program, respective distances of each avatar from an object in the gaming environment;
the computer dividing, by the bandwidth reducing program, the group of players into a first subgroup of players with avatars located within a threshold proximity from the object and a second subgroup of players with avatars located beyond the threshold proximity from the object;
the computer identifying, by the bandwidth reducing program, first communications data and an attribute of a first avatar of a first player in the first subgroup of players, wherein the attribute of the first avatar comprises a proximity of the first avatar to one or more other avatars of the first subgroup;
the computer identifying, by the bandwidth reducing program, second communications data and an attribute of a second avatar of a second player in the first subgroup of players, wherein the attribute of the second avatar comprises a proximity of the second avatar to one or more other avatars of the first subgroup;
the computer determining, by the bandwidth reducing program, a first weighted value for the first avatar based on the identified attribute of the first avatar and the first communications data;
the computer determining, by the bandwidth reducing program, a second weighted value for the second avatar based on the identified attribute of the second avatar and the second communications data;
the computer determining, by the bandwidth reducing program, whether the first weighted value of the first avatar is greater than the second weighted value of the second avatar;
the computer sorting, by the bandwidth reducing program, gaming session data for the first subgroup of players into first common data that applies to all players in the first subgroup of players and first non-common data that specifically applies to a particular player of the first subgroup of players;
responsive to a determination that the first weighted value of the first avatar is greater than the second weighted value of the second avatar, the computer sending, by the bandwidth reducing program, the first common data to a data managing program that is executing on a gaming device of the first player, wherein the data managing program executing on the gaming device of the first player passes the first common data to a data managing program that is executing on a gaming device of the second player thereby reducing bandwidth required to host the gaming session; and the computer sending, by the bandwidth reducing program, the first non-common data to a data managing program executing on a gaming device of the particular player of the first subgroup.

2. The method of claim 1, wherein one or both of the attribute of the first avatar and the attribute of the second avatar further comprises one or more of a role that is performed by the avatar, a status of the avatar, and a location of the avatar within the gaming environment of the gaming session.

3. The method of claim 1, the method further comprising:

the computer identifying, by the bandwidth reducing program, third communications data and an attribute of a third avatar of a third player in the second subgroup of players, wherein the attribute of the third avatar comprises a proximity of the third avatar to one or more other avatars of the second subgroup;

the computer identifying, by the bandwidth reducing program, fourth communications data and an attribute of a fourth avatar of a fourth player in the second subgroup of players, wherein the attribute of the fourth avatar comprises a proximity of the fourth avatar to one or more other avatars of the second subgroup;

the computer determining, by the bandwidth reducing program, a third weighted value for the third avatar based on the identified attribute of the third avatar and the third communications data;

the computer determining, by the bandwidth reducing program, a fourth weighted value for the fourth avatar based on the identified attribute of the fourth avatar and the fourth communications data;

the computer determining, by the bandwidth reducing program, that the third weighted value of the third avatar is greater than the fourth weighted value of the fourth avatar;

the computer sorting, by the bandwidth reducing program, gaming session data for the second subgroup of players into second common data that applies to all players in the second subgroup of players and second non-common data that specifically applies to a particular player of the second subgroup of players;

responsive to the determination that the third weighted value of the third avatar is greater than the fourth weighted value of the fourth avatar, the computer sending, by the bandwidth reducing program, the second common data to a data managing program that is executing on a gaming device of the third player, wherein the data managing program executing on the gaming device of the third player passes the second common data to a data managing program that is executing on a gaming device of the fourth player thereby reducing bandwidth required to host the gaming session; and the computer sending, by the bandwidth reducing program, the second non-common data to a data managing program executing on a gaming device of the particular player of the second subgroup.

4. The method of claim 1, the method further comprising:

the computer determining, by the bandwidth reducing program, if the first player is able to receive the first common data;

responsive to a determination that the first player is unable to receive the first common data, the computer identifying, by the bandwidth reducing program, another player of the first subgroup to receive the first common data, wherein the another player is identified based, at least in part, on an attribute of an avatar of the third player, and an attribute of the second avatar; and the computer substituting, by the bandwidth reducing program, the another player for the first player, such that the another player passes the first common data to the second player.

5. The method of claim 4, the method further comprising:

the computer determining, by the bandwidth reducing program, whether a proximity of the first avatar to the second avatar exceeds a threshold; and responsive to a determination that the proximity of the first avatar to the second avatar exceeds the threshold, the computer determining, by the bandwidth reducing program, that the first player is unable to receive the first common data.

6. The method of claim 1, wherein information including network quality of a service, quality of a player's gaming device, and physical location of a player's avatar in relation to other player's avatars is weighted more heavily.

7. The method of claim 1, wherein an attribute relating to a health status of a player's avatar is weighted more heavily.

8. A computer program product including a computer readable medium, wherein the computer readable medium is not a signal, the computer program product comprising:

one or more computer-readable storage media and program instructions stored on the one or more computer-readable storage media, the program instructions comprising:

program instructions to identify a group of players that are participating in a gaming session hosted by the computer, the gaming session including a gaming environment, each player of the group of players represented in the gaming environment by a respective avatar, the computer comprising a bandwidth reducing program;

program instructions to determine, by the bandwidth reducing program, respective distances of each avatar from an object in the gaming environment;

computer instructions to divide, by the bandwidth reducing program, the group of players into a first subgroup of players with avatars located within a threshold proximity from the object and a second subgroup of players with avatars located beyond the threshold proximity from the object;

program instructions to identify, by the bandwidth reducing program, first communications data and an attribute of a first avatar of a first player in the first subgroup of players, wherein the attribute of the first avatar comprises a proximity of the first avatar to one or more other avatars of the first subgroup;

program instructions to identify, by the bandwidth reducing program, second communications data and an attribute of a second avatar of a second player in the first subgroup of players, wherein the attribute of the second avatar comprises a proximity of the second avatar to one or more other avatars of the first subgroup;

program instructions to determine, by the bandwidth reducing program, a first weighted value for the first avatar based on the identified attribute of the first avatar and the first communications data;

program instructions to determine, by the bandwidth reducing program, a second weighted value for the second avatar based on the identified attribute of the second avatar and the second communications data;

program instructions to determine, by the bandwidth reducing program, whether the first weighted value of the first avatar is greater than the second weighted value of the second avatar;

program instructions to sort, by the bandwidth reducing program, gaming session data for the first subgroup of players into first common data that applies to all players in the first subgroup of players and first non-common data that specifically applies to a particular player of the first subgroup of players;

program instructions to respond to a determination that the first weighted value of the first avatar is greater than the second weighted value of the second avatar by sending, by the bandwidth reducing program, the first common data to a data managing program that is executing on a gaming device of the first player, wherein the data managing program executing on the gaming device of the first player passes the first common data to a data managing program that is executing on a gaming device of the second player thereby reducing bandwidth required to host the gaming session; and program instructions to send, by the bandwidth reducing program, the first non-common data to a data managing program executing on a gaming device of the particular player of the first subgroup.

9. The computer program product of claim 8, wherein one or both of the attribute of the first avatar and the attribute of the second avatar further comprises one or more of a role that is performed by the avatar, a status of the avatar, and a location of the avatar within the gaming environment of the gaming session.

10. The computer program product of claim 8, the program instructions further including:

program instructions to identify, by the bandwidth reducing program, third communications data and an attribute of a third avatar of a third player in the second subgroup of players, wherein the attribute of the third avatar comprises a proximity of the third avatar to one or more other avatars of the second subgroup;

program instructions to identify, by the bandwidth reducing program, fourth communications data and an attribute of a fourth avatar of a fourth player in the second subgroup of players, wherein the attribute of the fourth avatar comprises proximity of the fourth avatar to one or more other avatars of the second subgroup;

program instructions to determine, by the bandwidth reducing program, a third weighted value for the third avatar based on the identified attribute of the third avatar and the third communications data;

program instructions to determine, by the bandwidth reducing program, a fourth weighted value for the fourth avatar based on the identified attribute of the fourth avatar and the fourth communications data;

program instructions to determine, by the bandwidth reducing program, that the third weighted value of the third avatar is greater than the fourth weighted value of the fourth avatar;

program instructions to sort, by the bandwidth reducing program, gaming session data for the second subgroup of players into second common data that applies to all players in the second subgroup of players and second non-common data that specifically applies to a particular player of the second subgroup of players;

program instructions to respond to a determination that the third weighted value of the third avatar is greater than the fourth weighted value of the fourth avatar by sending, by the bandwidth reducing program, the second common data to a data managing program that is executing on a gaming device of the third player, wherein the data managing program executing on the gaming device of the third player passes the second common data to a data managing program that is executing on a gaming device of the fourth player thereby reducing bandwidth required to host the gaming session; and program instructions to send, by the bandwidth reducing program, the second non-common data to a data managing program executing on a gaming device of the particular player of the second subgroup.

11. The computer program product of claim 8, the program instructions further including:

program instructions to determine, by the bandwidth reducing program, if the first player is able to receive the first common data;

program instructions to respond to a determination that the first player is unable to receive the first common data by identifying, by the bandwidth reducing program, another player of the first subgroup to receive the first common data, wherein the another player is identified based, at least in part, on an attribute of an avatar of the another player, and an attribute of the second avatar; and program instructions to substitute, by the bandwidth reducing program, the another player for the first player, such that the another player passes the first common data to the second player.

12. The computer program product of claim 11, the program instructions further including:

program instructions to determine, by the bandwidth reducing program, whether a proximity of the first avatar to the second avatar exceeds a threshold; and program instructions to respond to a determination that the proximity of the first avatar to the second avatar exceeds the threshold by determining, by the bandwidth reducing program, that the first player is unable to receive the first common data.

13. A computer system comprising a computer processor, wherein the computer system comprises:

program instructions to identify a group of players that are participating in a gaming session hosted by the computer, the gaming session including a gaming environment, each player of the group of players represented in the gaming environment by a respective avatar, the computer comprising a bandwidth reducing program;

program instructions to determine, by the bandwidth reducing program, respective distances of each avatar from an object in the gaming environment;

computer instructions to divide, by the bandwidth reducing program, the group of players into a first subgroup of players with avatars located within a threshold proximity from the object and a second subgroup of players with avatars located beyond the threshold proximity from the object;

program instructions to identify, by the bandwidth reducing program, first communications data and an attribute of a first avatar of a first player in the first subgroup of players, wherein the attribute of the first avatar comprises a proximity of the first avatar to one or more other avatars of the first subgroup;

program instructions to identify, by the bandwidth reducing program, second communications data and attribute of a second avatar of a second player in the first subgroup of players, wherein the attribute of the second avatar comprises a proximity of the second avatar to one or more other avatars of the first subgroup;

program instructions to determine, by the bandwidth reducing program, a first weighted value for the first avatar and the second avatar based on the identified attribute of the first avatar and the first communications data;

program instructions to determine, by the bandwidth reducing program, a second weighted value for the second avatar based on the identified attribute of the second avatar and the second communications data;

program instructions to determine, by the bandwidth reducing program, whether the first weighted value of the first avatar is greater than the second weighted value of the second avatar;

program instructions to sort, by the bandwidth reducing program, gaming session data for the first subgroup of players into first common data that applies to all players in the first subgroup of players and first non-common data that specifically applies to a particular player of the first subgroup of players;

program instructions to respond to a determination that the first weighted value of the first avatar is greater than the second weighted value of the second avatar by sending, by the bandwidth reducing program, the first common data to a data managing program that is executing on a gaming device of the first player, wherein the data managing program executing on the gaming device of the first player passes the first common data to a data managing program that is executing on a gaming device of the second player thereby reducing bandwidth required to host the gaming session; and program instructions to send, by the bandwidth reducing program, the first non-common data to a data managing program executing on a gaming device of the particular player of the first subgroup.

14. The computer system of claim 13, wherein one or both of the attribute of the first avatar and the attribute of the second avatar further comprises one or more of a role that is performed by the avatar, a status of the avatar, and a location of the avatar within the gaming environment of the gaming session.

15. The computer system of claim 13, the program instructions further including:

program instructions to identify, by the bandwidth reducing program, third communications data and an attribute of a third avatar of a third player in the second subgroup of players, wherein the attribute of the third avatar comprises a proximity of the third avatar to one or more other avatars of the second subgroup;

program instructions to identify, by the bandwidth reducing program, fourth communications data and an attribute of a fourth avatar of a fourth player in the second subgroup of players, wherein the attribute of the fourth avatar comprises a proximity of the fourth avatar to one or more other avatars of the second subgroup;

program instructions to determine, by the bandwidth reducing program, a third weighted value for the third avatar based on the identified attribute of the third avatar and the third communications data;

program instructions to determine, by the bandwidth reducing program, a fourth weighted value for the fourth avatar based on the identified attribute of the fourth avatar and the fourth communications data;

program instructions to determine, by the bandwidth reducing program, that the third weighted value of the third avatar is greater than the fourth weighted value of the fourth avatar;

program instructions to sort, by the bandwidth reducing program, gaming session data for the second subgroup of players into second common data that applies to all players in the second subgroup of players and second non-common data that specifically applies to a particular player of the second subgroup of players;

program instructions to respond to a determination that the third weighted value of the third avatar is greater than the fourth weighted value of the fourth avatar by sending, by the bandwidth reducing program, the second common data to a data managing program that is executing on a gaming device of the third player, wherein the data managing program executing on the gaming device of the third player passes the second common data to a data managing program that is executing on a gaming device of the fourth player thereby reducing bandwidth required to host the gaming session; and program instructions to send, by the bandwidth reducing program, the second non-common data to a data managing program executing on a gaming device of the particular player of the second subgroup.

16. The computer system of claim 13, the program instructions further including:

program instructions to determine, by the bandwidth reducing program, if the first player is able to receive the first common data;

program instructions to respond to a determination that the first player is unable to receive the first common data by identifying, by the bandwidth reducing program, another player of the first subgroup to receive the first common data, wherein the another player is identified based, at least in part, on an attribute of an avatar of the another player, and an attribute of the second avatar; and program instructions to substitute, by the bandwidth reducing program, the another player for the first player, such that the another player passes the first common data to the second player.

17. The computer system of claim 16, the program instructions further including:

program instructions to determine, by the bandwidth reducing program, whether a proximity of the first avatar to the second avatar exceeds a threshold; and program instructions to respond to a determination that the proximity of the first avatar to the second avatar exceeds the threshold by determining, by the bandwidth reducing program, that the first player is unable to receive the first common data.

* * * * *